United States Patent [19]

Ravishankar et al.

[11] Patent Number: 5,766,713
[45] Date of Patent: Jun. 16, 1998

[54] ELASTOMERIC VEHICLE HOSES

[75] Inventors: Periagaram S. Ravishankar, Kingwood, Tex.; Jean-Roch Schauder, Wavre, Belgium

[73] Assignee: Exxon Chemical Patents Inc., Houston, Tex.

[21] Appl. No.: 490,385

[22] Filed: Jun. 14, 1995

[51] Int. Cl.$^6$ .................................. C08F 255/04
[52] U.S. Cl. ............... 428/36.92; 428/36.8; 428/36.9; 428/500; 428/521; 428/523; 138/118; 138/126
[58] Field of Search ................... 428/36.8, 36.9, 428/36.92, 500, 521, 523; 138/118, DIG. 4, 126

[56] References Cited

U.S. PATENT DOCUMENTS

| | | | |
|---|---|---|---|
| 3,674,754 | 7/1972 | Cameli et al. | 526/283 |
| 4,156,767 | 5/1979 | Hall | 526/282 |
| 4,734,305 | 3/1988 | Sugimoto et al. | 428/36 |
| 5,118,773 | 6/1992 | Takao et al. | 526/283 |
| 5,279,874 | 1/1994 | Ichikawa et al. | 428/36.92 |
| 5,300,579 | 4/1994 | Aoshima et al. | 525/290 |
| 5,449,713 | 9/1995 | Nakahama | 525/240 |
| 5,468,809 | 11/1995 | Ghisellini et al. | 525/240 |
| 5,502,112 | 3/1996 | Peacock | 525/240 |

FOREIGN PATENT DOCUMENTS

| | | |
|---|---|---|
| 0 094051 | 11/1983 | European Pat. Off. . |
| A-0 277003 | 8/1988 | European Pat. Off. . |
| A-0 277004 | 8/1988 | European Pat. Off. . |
| 1694806 | 5/1971 | Germany . |
| 1795754 | 3/1974 | Germany . |
| S62-151758 | 1/1988 | Japan . |
| S62-210169 | 3/1989 | Japan . |
| WO 91/09882 | 7/1991 | WIPO . |
| WO 92/00333 | 1/1992 | WIPO . |
| WO 93/11172 | 6/1993 | WIPO . |
| WO 94/03506 | 2/1994 | WIPO . |

*Primary Examiner*—Charles Nold
*Attorney, Agent, or Firm*—Douglas W. Miller

[57] ABSTRACT

Elastomeric vehicle hoses based on ethylene, alpha-olefin, vinyl norbornene elastomeric polymers will exhibit improved cure state and improved long term heat aging. Long term heat aging is an important consideration, as vehicle lives get longer and under the hood temperatures get higher. Also, such elastomeric based hoses will have improved compression set under a wide range of service temperatures. Such excellent compression set values lead to improved sealability over a wide temperature range. Additionally, these elastomeric polymers exhibit lower compound viscosity leading generally to improved processability.

9 Claims, 1 Drawing Sheet

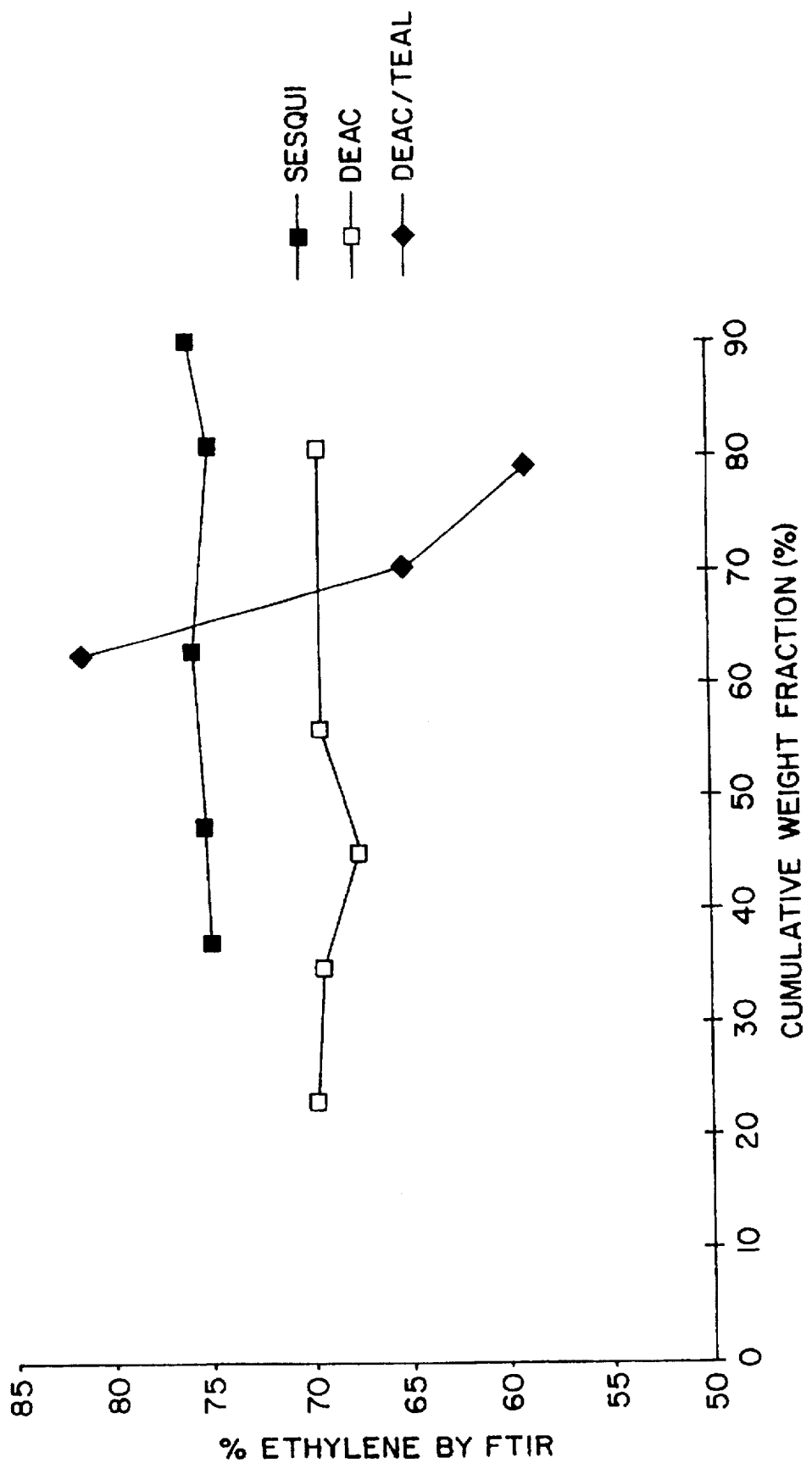

ELASTOMERIC VEHICLE HOSES

TECHNICAL FIELD

Various embodiments of this invention generally pertain to the field of molded or extruded elastomeric vehicle hoses or fluid lines. More particularly the present invention is directed to vehicle hoses utilizing ethylene, α-olefin, vinyl norbornene elastomeric polymers displaying improved processability and improved vulcanization characteristics.

BACKGROUND

Elastomeric polymer compounds and optionally various reinforcing fibers and or fabrics, form the basis of many hoses or fluid lines used in motor vehicles. Such hoses or fluid lines (hereinafter "hoses") are intended generally to carry various fluids, such as brake fluid, air-conditioning coolant, radiator coolant (including water and other coolants known to those of ordinary skill in the art), and the like. In the last quarter of the 20th century automobiles have become more aerodynamically designed, and generally smaller than vehicles which enjoyed popularity earlier. The relatively smaller engines in wide use today, delivering similar torque to earlier engines, but at higher revolutions, and the demand for lower emissions, all are among the factors that have caused the temperature under a vehicle's hood or in its engine compartment to increase over those generally seen previously.

At such relatively elevated temperatures, elastomeric polymers previously used for under the hood parts, specifically hoses, generally no longer perform adequately. Beginning in the late 1980's, ethylene, alpha-olefin, diene monomer elastomeric polymer based compounds became generally the elastomers of choice for these demanding hose uses, due to their higher filler acceptance, along with their excellent ozone, weathering and temperature resistance, compared to other previously used elastomers such as styrene butadiene rubber (SBR), and butadiene rubber (BR). These ethylene, alpha-olefin, non-conjugated diene monomer elastomeric polymers, have been most often available incorporating dienes included in the group 5-ethylidene-2-norbornene, 1,4-hexadiene, 1,6 octadiene, 5-methyl-1,4 hexadiene, 3,7-dimethyl-1,6-octadiene or combinations thereof, and the like as the diene monomers.

Performance of these hoses across a broad temperature range remains important. Among these performance parameters, a hose should exhibit good sealability. Sealability is the property that describes the ability of a hose or other fluid transmitting device to maintain contact with other fluid transmitting channels, such as an engine block or radiator, such that generally no fluid is lost neither during startup at low ambient temperatures (down to about −40° C.) nor at the highest temperature the hose will see.

While ethylene, alpha-olefin, non-conjugated diene monomer elastomeric polymers are often the elastomeric polymers of choice for today's vehicle hoses, if the state of cure or cross-ink density could be improved or increased, many of the important physical properties might be improved. Most notable among the improvements sought would be compression set (reduction). An improvement in compression set would improve sealability, a highly desirable improvement. Additionally, if the elastomer viscosity could be decreased without compromising physical properties, hoses could be extruded faster, permitting better utilization of existing equipment. In sulfur cured elastomer hoses, some fluids transmitted in combination with the sulfur can cause certain extractables to form which have the potential to cause clogging of fluid transmission systems.

Such improved performance, while maintaining low temperature operability as well as improved high temperature operability, is important, because failure of hoses can result in inconvenience or in the extreme, possible engine damage. Many auto manufacturers have increased performance specifications in response to the higher under the hood temperatures. Higher elastomer concentrations in hose compounds have generally become the norm due to the need for higher elasticity (elongation or compression set). These facts combined with the needs of the hose or part manufacturer to produce a high quality part, at low cost, indicate a need for ever higher performance and manufacturing standards for elastomers, compounds made from these elastomers, and parts such as hoses made from these compounds.

To meet these higher end use temperature requirements, and also minimize extractable levels usually present when traditional sulfur cure systems are used, peroxides increasingly have become the cure system of choice for the ethylene, alpha-olefin, diene monomer elastomeric polymer systems. Now the part or hose manufacturer's and the auto manufacturer's primary concerns are with improving the already broad service temperature ranges of hoses made from ethylene, alpha-olefin, diene monomer elastomeric polymers and their compounds, pushing the upper portion of the temperature range above the previous 120° C. temperature upper specification level to, at or above 150° C., as well as improving compression set.

Concurrent with the higher specifications required by vehicle manufacturers, hose manufacturers, continue to improve their manufacturing economies, while maintaining the high quality demanded of hoses. Improving manufacturing economics is generally an area where often improved rates of manufacture, and lowering raw material costs are most attractive. Because of the need for a substantially full cure in the hose manufacturing process to generally minimize premature hoses device failures, hose manufacturer's generally do not substantially adjust the curative levels of their hose compounds. Thus the part fabricator must balance the optimum properties of the end use hose, with the need to improve or reduce manufacturing costs.

There is a commercial need therefore for an elastomeric polymer, that when compounded into a hose formulation can meet or exceed vehicle manufacturer's specifications as well as offer improved processability, good low temperature sealability at potentially lower curative levels, and the resultant manufacturing economies.

SUMMARY

We have discovered that inclusion of an ethylene, α-olefin, vinyl norbornene elastomeric polymers in compounds intended for use in vehicle hose, applications, can provide advantages in the compounding, and curing of vehicle hoses, as well as advantages in the use performance of the hoses. These advantages include higher cross-link density, and more complete cures, leading generally to longer useful life, reduced compression set, and better retention of properties after heat and oil aging. We have thus found that the above mentioned disadvantages associated with prior suggested solutions to the problems of obtaining vehicle hoses having a broader range of useful temperatures, improved compression set, while improving processing and or processing economics, can generally be solved by the elastomeric polymers, articles made from these elastomeric polymers, and methods for making vehicle hoses of various embodiments of our invention.

The elastomeric polymer comprises ethylene, an alpha-olefin, and vinyl norbornene. These elastomeric polymers, compounds made from them, and automobile or vehicle hoses made from these compounds are contemplated. We will show that these materials satisfy the need disclosed above for improved high temperature performance and aging both in the elevated temperature of an engine compartment, at low ambient temperatures, and with the added requirement of resisting deterioration in the presence of transmitting fluids, often hostile fluids (hostile to elastomer compounds) and where the fluids may be at elevated temperatures as well, improved processability, improved cure state or cross-link-density and the like. Moreover, these elastomeric polymers are shown to meet hose requirements when used alone, while heretofore such requirements could be met generally only by using blends of two elastomeric polymers (generally ethylene, propylene, ethylidene norbornene), one with a narrower molecular weight distribution, the other with a broad molecular weight distribution. Replacement of such blends with a single polymer may improve batch to batch consistency. The vehicle hose or fluid transmitting line will comprise an ethylene, alpha-olefin, vinyl norbornene elastomeric polymer (either by itself as the sole elastomeric polymer or in combination with other peroxide curable elastomeric polymers), where the elastomeric polymer has an ethylene content in the range of from about 50 to about 90 mole percent, a vinyl norbornene content in the range of from about 0.2 to about 5 mole percent, based on the total moles of the elastomeric polymer, the remainder of the polymer will include an alpha-olefin, at a level in the range of from about 10 to about 50 mole percent. Wherein a compound made utilizing such an elastomeric polymer has: a) ML (1+4) 100° C. below 90, b) a MH above about 70, c) a 100 percent modulus above about 4 Mpa, d) a weight increase in oil below about 70 percent, e) a Volkswagen compression set below about 60.

BRIEF DESCRIPTION OF THE DRAWINGS

These and other features, aspects, and advantages of the present invention will become better understood with regard to the following descriptions, appended claims, and accompanying drawings where:

FIG. 1 shows co-catalyst influence on polymer compositional distribution

DESCRIPTION
Introduction

Various embodiments of our present invention concern certain classes of ethylene, α-olefin, vinyl norbornene elastomeric polymers, vehicle hoses fabricated therefrom, and their uses. These elastomeric polymers and compounds made from them have unique characteristics which make them well suited for use in certain applications. Hoses, fluid delivery mechanisms, and the like made from these compounds, exhibit improved resistance to deterioration in hostile environments when compared to hoses and fluid delivery or receiving mechanisms, and the like based on molded and/or extruded parts made from previously available materials, such as ethylene α-olefin, diene monomer elastomers containing, for instance, dienes included in the group 5-ethylidene-2-norbornene, 1,4-hexadiene, 1,6 octadiene, 5-methyl-1,4 hexadiene, 3,7-dimethyl-1,6-octadiene, or combinations thereof, and the like as the diene monomers as well as styrene butadiene rubbers, butadiene rubbers, and compounds derived from them. A detailed description of certain preferred elastomeric polymers for use in fabricating such hose parts, that are within the scope of our invention, preferred methods of producing the elastomeric polymers, and the preferred applications of the molded or extruded parts follow.

Those skilled in the art will appreciate the numerous modifications to these preferred embodiments can be made without departing from the scope of the invention. For example, although the properties of hoses are used to exemplify the attributes of the polymers of the present invention, the polymers have numerous other fluid transmission uses. To the extent that our description is specific, this is solely for the purpose of illustrating preferred embodiments of our invention and should not be taken as limiting our invention to these specific embodiments.

The use of subheadings in the description is intended to assist the reader and is not intended to limit the scope of our invention in any way.

It has been discovered that the inclusion of vinyl norbornene as the non-conjugated diene component of an ethylene, alpha-olefin, diene monomer elastomeric polymer portion of a peroxide cured hose compound, produces hose having a higher cure state, generally a lower curative level to attain the same or improved cure state based on an equivalent non-conjugated diene content (where the diene is other than vinyl norbornene) in an elastomeric polymer, improved compression set, low temperature sealability, lower extractability, competitive air and hot coolant aging results. Additionally, the ethylene, alpha-olefin, vinyl norbornene elastomeric polymers of certain embodiments of the present invention on which the hose compounds are based, will generally need lower levels of diene to achieve similar or improved physical properties when compared to hoses made from previously available ethylene, alpha-olefin, diene monomer elastomeric polymers based on dienes other than vinyl norbornene. At substantially equivalent curative system levels, the lower level of diene may lead to better heat aging, extending the temperature operating range of hose based on certain embodiments of the present invention, when compared with materials previously available. This feature permits the use of materials such as those described in the present invention in hose over a generally wide range of temperatures due to either ambient conditions (generally the low temperature requirement) or increased under the hood temperatures and for long useful part life.

The ability to combine hose compounds which have improved processability, (lower head pressure in the extruders, during the extrusion process and have a lower potential risk of premature vulcanization) generally leading to more consistent and smoother batches during compounding, with fuller, more complete cure and the resultant improved physical properties, and wider operating temperature range, for the finished hose has heretofore been generally difficult to attain.

Hoses manufactured based on the elastomeric polymers of certain embodiments of the present invention will include ingredients that will be well known to those of ordinary skill in the art. Such ingredients include, but are not limited to, carbon black process aids, waxes, antioxidants, accelerators, and curatives. Hoses may also contain fibers and or fabrics of materials and at levels well known to those of ordinary skill in the art.

Included in the hoses contemplated by certain embodiments of the present invention are coolant hoses (radiator hoses),other fluid delivery apparatus and the like, which will be known to those of ordinary skill in the art.

Definition of Terms and Tests

| Parameter | Units | Test |
|---|---|---|
| Mooney Viscosity* (elastomeric polymer content determination) | ML1 + 8, 125° C., MU % | ASTM D 1646 ASTM D 3900 |
| Ethylene weight Ethylidene Norbornene | % | FT. - Infra Red |
| Vinyl Norbornene | % | FT - Infra Red |
| Mooney Viscosity (compound) | ML1 + 4, 100° C., MU | ASTM D1646 |
| Scorch time Mooney Oscillating Disk Rheometer at 180° C., ±3° arc | $T_s5$, 125° C., minutes | ASTM D1646 ASTM D 2084 |
| ML | daN · m | |
| MH | daN · m | |
| MH-ML | daN · m | |
| Physical Properties steam cured 20 min. @ 180° C. | | |
| Hardness | Shore A | ASTM D 2240 |
| Modulus 100% | MPa | ASTM D 412 |
| Tensile Strength | MPa | dieC |
| Elongation at Break | % | |
| Hot Air Aging, 94 hrs. @ 160° C. | | DIN 53504 |
| Hardness | Shore A | |
| Tensile | MPa | |
| Elongation | MPa | |
| Elongation at break | % | |
| Aging in Oil ASTM 2, 22 hours @ 160° C. | | ASTM D471 |
| Hardness | Shore A | |
| Tensile | MPa | |
| Elongation | % | |
| Weight Increase in Oil | | |
| VW Compression Set Press Cured 12 min. 22 hrs/160° C. + 3 hr at RT | % | VW TL 523 61 |

*ethylene, alpha-olefin, diene monomer elastomeric polymer

The Ethylene, Alpha-Olefin, Vinyl Norbornene Elastomer

The ethylene, alpha-olefin, vinyl norbornene elastomeric polymer component contains ethylene in the range of from about 50 to about 90 mole percent ethylene, preferably in the range of from about 50 to about 70 mole percent, more preferably in the range of from about 50 to about 65 mole percent based on the total moles of the polymer. The ethylene, alpha-olefin, diene monomer elastomeric polymer contains, in range of from about 0.2 to about 5.0 mole percent of vinyl norbornene, preferably in the range of from about 0.3 to about 3.0 mole percent, more preferably in the range of from about 0.4 to about 2.5 mole percent, most preferably in the range of from about 0.4 to about 1.0 mole percent. The balance of the ethylene, alpha-olefin, diene monomer will generally be made up of an alpha-olefin, selected from the group propylene, butene-1, hexene-1, 4-methyl-1-pentene, octene-1, decene-1, and the like. The preferred alpha-olefins are propylene, hexene-1 and octene-1, most preferred is propylene. The alpha-olefins will be present in the elastomeric polymer, in the range of from about 10 to about 50 preferably from about 30 to 50, about more preferably from about 35 to about 50 mole percent. The elastomeric polymer will have an $M_w$, GPC, LALLS/$M_n$, GPC, DRI above about 6, preferably above about 8, more preferably above about 10, most preferably above about 15.

The polymer will have a Mooney viscosity ML (1+8) 125° C. generally in the range of from about 20 to about 120, preferably in the range of from about 30 to about 100, more preferably in the range of from about 50 to about 100, most preferably in the range of from about 65 to about 100. The polymer will have a branching index (BI) (defined below) generally in the range of from about 0.1 to about 0.6, preferably in the range of from about 0.1 to about 0.4, more preferably in the range of from about 0.1 to about 0.3.

Compounds intended for hose formulations made according to the recipes in the Examples, will have the following ranges of properties:

ML (1+4) 100° C. below about 90, preferably below about 80, more preferably below about 75, most preferably below about 70.

MH above about 70, preferably above about 80, more preferably above about 90. Modulus (100%) above about 4 MPa.

Weight gain in oil below about 70 percent, preferably below about 65 percent.

Volkswagen (VW) compression set below about 60 percent, preferably below about 55 percent, more preferably below about 50 percent.

Method of Producing Ethylene, Alpha-Olefin, Vinyl Norbornene Component

The Ziegler polymerization of the pendent double bond in vinyl norbornene incorporated in the polymer backbone is believed to produce a highly branched ethylene, alpha-olefin, non-conjugated diene elastomeric polymer. This method of branching permits the production of ethylene, alpha-olefin, diene monomer elastomeric polymers substantially free of gel which would normally be associated with cationically branched ethylene, alpha-olefin, diene monomer elastomers containing, for instance, ethylidene norbornene as the termonomer. The synthesis of substantially gel-free ethylene, alpha-olefin, non-conjugated diene elastomeric polymer elastomers containing vinyl norbornene is discussed in Japanese laid open patent applications JP 151758 and JP 210169.

Preferred embodiments of the aforementioned documents to synthesize polymers suitable for this invention are described below:

The catalysts used are VOCl$_3$ (vanadium oxytrichloride) and VCl$_4$ (vanadium tetrachloride) with the later as the preferred catalyst. The co-catalyst is chosen from (i) ethyl aluminum sesqui chloride (SESQUI), (ii) diethyl aluminum chloride (DEAC) and (iii) equivalent mixture of diethyl aluminum chloride and triethyl aluminum (TEAL). As shown in FIG. (1), the choice of co-catalyst influences the compositional distribution in the polymer. The polymer with relatively broader compositional distribution may not have as good low temperature properties as relatively narrower compositional distribution polymers. The polymerization is carried out in a continuous stirred tank reactor at 20°–65° C. at a residence time of 6–15 minutes at a pressure of 7 kg/cm2. The concentration of vanadium to alkyl is from about 1 to 4 to 1 to 10. About 0.3 to 1.5 kg of polymer is produced per gram of catalyst fed to the reactor. The polymer concentration in the hexane solvent is in the range of 3–7 percent by weight. A discussion of catalysts suitable for polymerizing our elastomeric polymer or other catalysts and co-catalysts contemplated are discussed in the two Japanese laid open patent applications incorporated by reference above. The resulting polymer has the following molecular characteristics:

The inherent viscosities measured in decalin at 135° C. are in the range of 1.5–3.0 dl/g. The molecular weight distribution ($M_{w GPC-LALLS}/M_{n, GPC-DRI}$) (hereinafter $M_w/M_n$) (defined below) is greater than or equal to 6, preferably above about 8, more preferably above about 10, most preferably above about 15.

For peroxide cure applications, vinyl norbornene containing ethylene, alpha-olefin, non-conjugated diene elastomeric polymers require lower levels of peroxide at equivalent or similar diene levels to attain the same cure state compared to ethylene, alpha-olefin, non-conjugated diene elastomeric polymer with, for example, ethylidene norbornene as the non-conjugated diene monomer. Typically 20 to 40 percent lower peroxide consumption can be realized using ethylene, alpha-olefin, vinyl norbornene elastomeric polymers. The efficiency of vinyl norbornene in providing high cross-link density with peroxide vulcanization also permits a reduction in the overall diene level necessary to generally attain the same cure state as ethylene, alpha-olefin, non-conjugated elastomeric polymers where the diene is other than vinyl norbornene. This may result in enhanced heat aging performance, generally owing to lower diene incorporation, as well as a generally different cross linking mechanism. This unique combination of improved processability, lower peroxide usage, and enhanced heat aging are the benefits provided by ethylene, alpha-olefin, vinyl norbornene elastomeric polymers over conventional elastomers containing non-conjugated dienes such as a diene selected from the group consisting of 5-ethylidene-2-norbornene, 1,4-hexadiene, 1,6 octadiene, 5-methyl-1,4 hexadiene, 3,7-dimethyl-1,6-octadiene, or combinations thereof or the like, including terpolymers or tetrapolymers.

The relative degree of branching in ethylene, alpha-olefin, diene monomer elastomeric polymers is determined using a branching index factor. Calculating this factor requires a series of three laboratory measurements[1] of polymer properties in solutions. These are:

(i) weight average molecular weight ($M_{w,LALLS}$) measured using a low angle light scattering (LALLS) technique subsequent to a gel permeation chromatograph (GPC);

(ii) weight average molecular weight $M_{w,DRI}$ and viscosity average molecular weight ($M_{v,DRI}$) using a differential refractive index detector (DRI) with GPC and (iii) inherent viscosity (IV) measured in decalin at 135° C. The first two measurements are obtained in a gel permeation chromatograph (GPC) using a filtered dilute solution of the polymer in tri-chloro benzene.

[1] VerStrate, Gary "Ethylene-Propylene Elastomers", *Encyclopedia of Polymer Science and Engineering*, 6, 2nd edition, (1986)

An average branching index is defined as:

$$BI = \frac{M_{v,br} \times M_{w,DRI}}{M_{w,LALLS} \times M_{v,DRI}} \quad (1)$$

where, $M_{v,br}=k(IV)^{1/a}$. $M_{v,br}$ is viscosity average molecular weight for branched polymer and 'a' is the Mark-Houwink constant (=0.759 for ethylene, alpha-olefin, non-conjugated diene elastomeric polymer in decalin at 135° C.).

From equation (1) it follows that the branching index for a linear polymer is 1.0, and for branched polymers the extent of branching is defined relative to the linear polymer. Since at a constant $M_n$, $(M_w)_{branch} > (M_w)_{linear}$ BI for a branched polymers is less than 1.0, and a smaller BI value denotes a higher level of branching. It should be noted that this method indicate only the relative degree of branching and not a quantified amount of branching as would be determined using a direct method, i.e. NMR.

Metallocene catalysis of the above monomers is also contemplated including a compound capable of activating the Group 4 transition metal compound of the invention to an active catalyst state is used in the invention process to prepare the activated catalyst. Suitable activators include the ionizing noncoordinating anion precursor and alumoxane activating compounds, both well known and described in the field of metallocene catalysis.

Additionally, an active, ionic catalyst composition comprising a cation of the Group 4 transition metal compound of the invention and a noncoordinating anion result upon reaction of the Group 4 transition metal compound with the ionizing noncoordinating anion precursor. The activation reaction is suitable whether the anion precursor ionizes the metallocene, typically by abstraction of RI or $R_2$, by any methods inclusive of protonation, ammonium or carbonium salt ionization, metal cation ionization or Lewis acid ionization. The critical feature of this activation is cationization of the Group 4 transition metal compound and its ionic stabilization by a resulting compatible, noncoordinating, or weakly coordinating (included in-the term noncoordinating), anion capable of displacement by the copolymerizable monomers of the invention. See, for example, EP-A-0 277,003, EP-A-0 277,004, U.S. Pat. Nos. 5,198,401, 5,241,025, 5,387,568, WO 91/09882, WO 92/00333, WO 93/11172 and WO 94/03506 which address the use of noncoordinating anion precursors with Group 4 transition metal catalyst compounds, their use in polymerization processes and means of supporting them to prepare heterogeneous catalysts. Activation by alumoxane compounds, typically, alkyl alumoxanes, is less well defined as to its mechanism but is nonethe-less well known for use with Group 4 transition metal compound catalysts, see for example U.S. Pat. No. 5,096,867. Each of these U.S. documents are incorporated by reference for purposes of U.S. patent practice.

The synthesis of ethylene, alpha-olefin, vinyl norbornene elastomeric polymers are conducted on a laboratory pilot unit (output about 4 Kg/day).

Other Hose Compound Ingredients

For purposes of this application the term parts per hundred parts of elastomeric polymer (pphep) will be considered equivalent to and interchangeable with parts per hundred rubber (phr)

Carbon black used in the reinforcement of rubber ingredient, generally produced from the combustion of a gas or an hydrocarbon feed and having a particle size from 20 nm to 100 nm for the regular furnace or channel black or from 150 to 350 nm for the thermal black. Level in a compound may range from 10 to 200 parts per hundred parts of elastomeric polymer (pphep).

Plasticizers such as aliphatic oils 10–50 pphep.

Process aids can be a mixture of fatty acid ester or calcium fatty acid soap bound on a mineral filler. Level in a compound may range from 0.5 to about 5 pphep.

Other types of process aid can be low molecular weight polyethylene (copolymer) wax, paraffin wax. Level in a compound may range from 0.5 to 5 pphep.

Antioxidants can be added to improve the long term heat aging, for instance a quinolin (polymeric trimethyl dihydroquinolin) and imidazole (Zinc-2-toluylmercapto imidazole).

Coagents and or activators are those used to improve the peroxide cross-link density by acting through an addition mechanism like sulfur, thiurams (tertamethylthiuram disulfide or dipentamethylene thiuram disulfide) (typically present at about 0.3 pphep) or methacrylates (ethyleneglycol dimethylacrylate or trimethylol-propan-trimethylacrylate) and maleimides (triallylcyanurate) (typically present at about 0.5 to about 5 pphep).

Curatives: Curing agents generally of the free radical type, including but not limited to peroxides, and the like. Examples include dicumylperoxide, 2,5-dimethyl- 2,5-bis (tert.butylperoxy) hexane, bis(tert.butylperoxy isopropy)benzene, 4,4-di tert.butylperoxy n-butyl valerate, 1,1-di tert butyl peroxy-3,3,5-trimethylcyclohexane 2–10 pphep.

EXAMPLES

Examples 1 and 2 represent commercially available ethylene, propylene, ethylidene norbornene elastomeric polymers that are used here generally as comparative examples.

Examples 3–9 describe various embodiments of our invention. In all runs, tests are performed on both the uncompounded elastomer and on compounded elastomers. The compounded formulations are standard (high temperature resistant) hose formulations except for Example 2, which is formulated as many commercial hose compounds in use currently.

In all of the compounded examples (except as noted) the ingredients are as follows, based on 100 parts of elastomer:

| | |
|---|---|
| Durex ® O (carbon black) | 110 phr |
| (Available from Degussa, A. G., Germany) | |
| Flexon ® 815 (Paraffinic Oil) | 45 phr |
| (Available from Esso, S. A. F., France) | |
| Flectol ® H (Polymeric | 1 phr |
| (2,2,4-trimethyl-1,2,-dihydroquinoline) | |
| (Available from Monsanto S. A., Belgium) | |
| EDMA | 0.5 phr |
| (ethylene/glycoldimethylacrylate, activator) | |
| (available from Lehman + Voss and | |
| Co., Germany) | |
| Perkadox ® 1440 | 7 phr |
| (bis(t-butylperoxy-isopropyl)benzene) | |
| (available from Akzo B. V., Holland) | |
| Formula weight in all cases is 263.5 | |

Example 1 is a commercial ethylene, propylene, ethylidene norbornene elastomeric polymer, available from Exxon Chemical Co as Vistalon® 7500, a nominal 49.5 weight percent, ethylene, 5.7 weight percent, ethylidene norbornene.

Example 2 is a mixture of 70 parts of Vistalon® 7500 with 53 parts of Vistalon® 3666, a nominal 58 weight percent ethylene, nominal 4.5 weight percent ethylidene norbornene. This combination is compounded with Durex® O at 60 phr, Flexon® 815 at 23 phr, EDMA at 0.5 phr, FEF/N550 DeGussa, A. G. Germany, 40 phr, Flectol® H at 1 phr, and Perkadox® 1440 at 7 phr.

Example 3 is an ethylene, propylene, vinyl norbornene elastomeric polymer (6268B) with a nominal 47.9 weight percent ethylene content, 1.1 weight percent vinyl norbornene, with the remainder made up of propylene.

Example 4 is an ethylene, propylene, vinyl norbornene elastomer (6283F) with a nominal 51.6 weight percent ethylene content, 4.9 weight percent vinyl norbornene, with the remainder made up of propylene.

Example 5 is an ethylene, propylene, vinyl norbornene elastomer (6315 A) with a nominal 50.9 weight percent ethylene content, 4.7 weight percent vinyl norbornene, with the remainder made up of propylene.

Example 6 is an ethylene, propylene, vinyl norbornene elastomer (6333F) with a nominal 50.1 weight percent ethylene content, 3.1 weight percent vinyl norbornene, with the remainder made up of propylene.

Example 7 is an ethylene, propylene, vinyl norbornene elastomer (6325F) with a nominal 50.1 weight percent ethylene content, 2.9 weight percent vinyl norbornene, with the remainder made up of propylene.

Example 8 is an ethylene, propylene vinyl norbornene elastomer (6376A) with a nominal 55 weight percent ethylene content, 2 weight percent vinyl norbornene; with the remainder made up of propylene.

Example 9 is an ethylene, propylene vinyl norbornene elastomer (6399A) with a nominal 55.1 weight percent ethylene content, 1.9 weight percent vinyl norbornene; with the remainder made up of propylene.

Example 3–8 are synthesized using $VCl_4$/EASC catalyst system.

Example 9 is synthesized using $VOCl_3$/EASC catalyst system. From Tables 1–2 the following information may be obtained:

The $M_w/M_n$ of Examples 1 and 2, (Vistalon®7500 and blend of Vistalon® 7500/V3666) are generally less than 6. The $M_w/M_n$ for examples 3–9 are generally above 6.

The Mooney Viscosity of compounds of Examples 1 and 2 tend to be substantially higher than those of the ethylene, alpha-olefin, vinyl norbornene elastomeric terpolymers of Examples 3–9, indicating a less processable compound. Examples 4–9, containing vinyl norbornene have a higher cure state, indicating a more complete cure, evidenced by a higher ODR MH, generally having greater than 50 percent greater ODR (MH) than either Examples 1 or 2. Example 3 at the lowest vinyl norbornene content has a comparable cure state to the reference Examples 1 and 2.

Compression set of examples 1 and 2 at 58 and 60 respectively are substantially higher (18 percent) than the highest of examples 4–9. Again, the lowest vinyl norbornene content is comparable to the reference Examples 1 and 2.

Modulus (100 percent) of Examples 1 and 2 is in the 3.1 to 3.9 Mpa range while that of Examples 4–9 is 15 to 60 percent improved over examples 1 and 2.

Weight increase after oil aging is also improved in Examples 4–9 compared to Examples 1 and 2. Although the present invention has been described in considerable detail with reference to certain preferred versions thereof, other versions are possible. For example, other compounding methods and recipes are contemplated, as well as other types of fluid delivery devices. Therefore, the spirit and scope of the appended claims should not be limited to the description of the preferred versions contained herein.

TABLE 1

COMPOSITION AND MOLECULAR CHARACTERISTICS OF
POLYMERS MADE IN SUPPORT OF THE INVENTION

| Example | Run No. | Mooney (1 + 8), 125° C. | Ethylene (wt %) | ENB (wt %) | VNB (wt %) | Mw/Mn | Intrinsic Viscosity | Branching Index |
|---|---|---|---|---|---|---|---|---|
| 1 | V 7500 | 82 | 50.1 | 5.7 | 0 | 5.1 | 2.55 | 0.5–0.6 |
| 3 | 6268B | 87 | 47.9 | 0 | 1.1 | 6.2 | 2.48 | 0.5 |
| 4 | 6283F | 99 | 51.6 | 0 | 4.9 | 31.4 | 2.55 | 0.2 |
| 5 | 6315A | 83 | 50.9 | 0 | 4.7 | 27 | 2.4 | 0.2 |
| 7 | 6325F | 66 | 50.1 | 0 | 2.9 | 8.3 | 2.11 | 0.3 |
| 6 | 6333F | 82 | 50.1 | 0 | 3.1 | 14.1 | NM | NM |
| 8 | 6376A | 74 | 55 | 0 | 2 | 27 | 1.57 | NM |
| 9 | 6399A | 69 | 55.1 | 0 | 1.9 | 11 | 1.91 | NM |

TABLE 2

| | Compound | | | | | | | | |
|---|---|---|---|---|---|---|---|---|---|
| | 1 R92/49 | 2 | 3 R92/21 | 4 R92/19 | 5 R92/53 | 6 R92/77 | 7 R92/75 | 8 R93/7 | 9 R93/9 |
| V.7500 | 100 | 70 | | | | | | | |
| CPU 6283F | | | | 100 | | | | | |
| CPU 6325F | | | | | | | 100 | | |
| CPU 6333F | | | | | | 100 | | | |
| CPU 6315A | | | | | 100 | | | | |
| CPU 6268B | | | 100 | | | | | | |
| CPU 6376A | | | | | | | | 100 | |
| CPU 6399A | | | | | | | | | 100 |
| V.3666 | | 53 | | | | | | | |
| DUREX O | 110 | 60 | | | | | | | |
| FLEXON 815 | 45 | 23 | | | | | | | |
| FLECTOH H | 1 | 1 | | | | | | | |
| EDMA | 0.5 | 0.5 | | | | | | | |
| FEF N-550 | — | 40 | | | | | | | |
| PERKADOX 1440 | 7 | 7 | | | | | | | |
| FORMULA WEIGHT | 263.50 | | | | | | | | |
| SPEC GRAVITY | 1.12 | | | | | | | | |
| Mixing Characteristics | | | | | | | | | |
| Mooney Viscosity ML 1 + 4 (100° C.) | 81 | 96 | 92 | 68 | 64 | 78 | 71 | 65 | 73 |
| ODR (Monsanto) 180° C., ± 3 Arc | | | | | | | | | |
| ODR-ML dNM | 13 | 19 | 15 | 12 | 11 | 13 | 11 | 11 | 12 |
| ODR-MH dNM | 70 | 88 | 83 | 147 | 128 | 122 | 118 | 92 | 94 |
| ODR MH-ML | 57 | 69 | 68 | 135 | 117 | 108 | 106 | 81 | 81 |
| ODR-Ts2 minutes | 1 | 1 | 1 | 1 | 1 | 1 | 1 | 1 | i |
| STEAM CURE 20 MIN AT 180° C. | | | | | | | | | |
| Hardness Shore A | 60 | 60 | 63 | 68 | 67 | 65 | 64 | 62 | 63 |
| Modulus 100 percent Mpa | 3.1 | 3.8 | 3.4 | 6.7 | 6.2 | 5.4 | 5.3 | 4.1 | 4.2 |
| Modulus 300 percent Mpa | 7.2 | 11.8 | 7.9 | | | | | 9.2 | 9.3 |
| Tensile Strength Mpa | 10.8 | 13.8 | 10.2 | 113 | 11 | 10.8 | 10 | 10.1 | 10.6 |
| Elongation at Break percent | 485 | 360 | 480 | 205* | 215* | 290 | 280 | 365 | 380 |
| AIR AGING 94 H AT 160° C. | | | | | | | | | |
| Hardness Shore A | 65 | 70 | 58 | 86* | 75* | 69 | 68 | 66 | 66 |
| Modulus 100 percent Mpa | 4.4 | 4.9 | 3.4 | | | 7.4 | 5.7 | 5.5 | 5.7 |
| Tensile Strength Mpa | 10.8 | 13.5 | 6.4 | 7.9 | 2.2 | 9.2 | 10.9 | 10.3 | 10.0 |
| Elongation at Break percent | 245 | 265 | 210 | 65 | 5 | 125 | 185 | 245 | 250 |
| OIL AGING ASTM 2, 22 H AT 100° C. | | | | | | | | | |
| Hardness Shore A | 40 | 43 | 41 | 58 | 57 | 53 | 53 | 49 | 50 |
| Modulus 100 percent Mpa | 3.1 | 4.4 | 3.3 | 6.4 | 6.5 | 5.8 | 5.7 | 4.7 | 4.6 |
| Tensile Strength Mpa | 6.9 | 9.4 | 7.6 | 8.1 | 7.9 | 8.1 | 7.5 | 7.3 | 7.5 |
| Elongation at Break percent | 316 | 230 | 330 | 150 | 150 | 195 | 200 | 215 | 225 |
| WEIGHT INCREASE IN OIL percent | 75 | 67 | NM | 46 | 50 | 56 | 57 | 65 | 62 |

TABLE 2-continued

| | Compound | | | | | | | | |
|---|---|---|---|---|---|---|---|---|---|
| | 1 R92/49 | 2 | 3 R92/21 | 4 R92/19 | 5 R92/53 | 6 R92/77 | 7 R92/75 | 8 R93/7 | 9 R93/9 |
| VW Comp. set 22 h at 160° C. + 3 h at RT percent | 58 | 60 | 60 | 28 | 29 | 43 | 36 | 49 | 51 |

*Poor values are due to higher catalyst residues absent in the other samples.

We claim:

1. A vehicle hose comprising:
  a) an ethylene, α-olefin, vinyl norbornene elastomeric polymer;
  wherein said elastomer has an $M_w/M_n$, greater than about 6;
  wherein a compound made from said elastomeric polymer has a ML(1+4) at 100° C. of less than about 90;
  wherein said elastomeric polymer has an ethylene content in the range of from about 50 mole percent to about 90 mole percent, an alpha-olefin content in the range of from about 10 to about 50 mole percent, and a vinyl norbornene content in the range of from about 0.2 to about 5 mole percent, based on the total moles of said elastomeric polymer; and
  wherein said elastomeric polymer has a branching index in the range of from about 0.1 to about 0.6.

2. The vehicle hose of claim 1, wherein:
  said compound has;
  i) a ML (1+4) 100° C. less than about 90;
  ii) an MH above about 70;
  iii) a VW compression set below about 60 percent; and
  iv) a weight gain in oil below about 70 percent.

3. The vehicle hose of claim 1 wherein:
  said elastomeric polymer has a branching index in the range of from about 0.1 to about 0.4; and
  said compound has:
  i) a ML(1+4) 100° C. less than about 80;
  ii) a MH above about 80;
  iii) a modulus at 100 percent, above about 4 MPa;
  iv) a VW compression below about 55 percent; and
  v) a weight gain in oil below about 65 percent.

4. The vehicle hose of claim 1 wherein:
  said elastomeric polymer has a branching index in the range of from about 0.1 to about 0.3; and
  said compound has:
  i) a ML (1+4) 100° C. less than about 75;
  ii) an MH above about 90; and
  iii) a VW compression set below about 50 percent.

5. The vehicle hose of claim 4 wherein said alpha-olefin is selected from the group consisting of propylene, butene-1, hexene-1, octene-1, and combinations thereof.

6. The vehicle hose of claim 5 wherein said elastomeric polymer has:
  a) a ML (1+8) 125° C. in the range of from about 20 to about 120; and
  b) a $M_w/M_n$ above about 8.

7. The vehicle hose of claim 5 wherein said elastomeric polymer includes:
  i) an ethylene content in the range of from about 50 to about 70 mole percent;
  ii) a vinyl norbornene content in the range of from about 0.3 to about 3.0 mole percent;
  iii) an alpha-olefin content in the range of from about 30 to about 50 mole percent, said mole percents based on the total moles of said elastomeric polymer;
  wherein said elastomeric polymer has
  a) a ML (1+8) 125° C. in the range of from about 30 to about 100; and
  b) a $M_w/M_n$ above about 10.

8. The vehicle hose of claim 5 wherein said elastomeric polymer includes:
  i) an ethylene content in the range of from about 50 to about 65 mole percent;
  ii) a vinyl norbornene content in the range of from about 0.4 to about 2.5 mole percent;
  iii) an alpha-olefin content in the range of from about 35 to about 50 mole percent, said mole percents based on the total moles of said elastomeric polymer;
  wherein said elastomeric polymer has
  a) a ML (1+8) 125° C. in the range of from about 50 to about 100
  b) a $M_w/M_n$ above about 15.

9. A vehicle hose comprising:
  an ethylene, alpha-olefin, vinyl norbornene elastomeric polymer, wherein said alpha-olefin is selected from the group consisting of propylene, butene-1, hexene-1, octene-1 and combinations thereof, wherein said elastomeric polymer includes ethylene in the range of from about 50 to about 65 mole percent, and said vinyl norbornene is present in the range of from about 0.4 to about 1.0 mole percent, an alpha-olefin content in the range of from about 35 to about 50 mole percent, said mole percents based on the total moles of said elastomeric polymer;
  wherein said elastomeric polymer has:
  i) a $M_w/M_n$ above about 15;
  ii) a ML (1+8) 125° C. in the range of from about 50 to about 100; and
  iii) a branching index in the range of from about 0.1 to about 0.3;
  wherein a vehicle hose compound including said elastomeric polymer has:
  1) a ML (1+4) 100° C. below about 70;
  2) a modulus (100 percent) above about 5 MPa;
  3) a VW compression set below about 50 percent; and
  4) a weight gain in oil below about 65 percent.

* * * * *